United States Patent
Downs, Jr. et al.

(10) Patent No.: US 9,156,357 B2
(45) Date of Patent: Oct. 13, 2015

(54) CONTROLLER FOR AN ELECTRIC MOTOR, AND A METHOD THEREOF

(71) Applicant: GM GLOBAL TECHNOLOGY OPERATIONS LLC, Detroit, MI (US)

(72) Inventors: Aubrey Walter Downs, Jr., Brighton, MI (US); William R. Cawthorne, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 142 days.

(21) Appl. No.: 14/023,957

(22) Filed: Sep. 11, 2013

(65) Prior Publication Data

US 2015/0073630 A1   Mar. 12, 2015

(51) Int. Cl.
| | | |
|---|---|---|
| *B60W 50/04* | (2006.01) | |
| *B60L 3/00* | (2006.01) | |
| *B60L 3/04* | (2006.01) | |
| *B60L 3/12* | (2006.01) | |
| *B60L 11/18* | (2006.01) | |
| *B60L 15/20* | (2006.01) | |
| *B60W 50/02* | (2012.01) | |

(52) U.S. Cl.
CPC .............. *B60L 3/0084* (2013.01); *B60L 3/0061* (2013.01); *B60L 3/04* (2013.01); *B60L 3/12* (2013.01); *B60L 11/1803* (2013.01); *B60L 15/20* (2013.01); *B60W 50/04* (2013.01); *B60L 2240/421* (2013.01); *B60L 2240/423* (2013.01); *B60L 2240/429* (2013.01); *B60W 2050/021* (2013.01)

(58) Field of Classification Search
CPC ... B60W 50/02; B60W 50/04; B60W 50/045; B60W 2050/021; B60W 2050/0295; B60W 2050/041; B60W 2050/043; B60L 3/0084; G05B 23/0256; G05B 2219/24125; G05B 2219/24189

USPC .......................................... 701/22, 29.2, 32.8
See application file for complete search history.

(56) References Cited

U.S. PATENT DOCUMENTS

| | | | | |
|---|---|---|---|---|
| 5,630,046 | A * | 5/1997 | Loise | 714/11 |
| 6,490,511 | B1 * | 12/2002 | Raftari et al. | 701/22 |
| 7,426,099 | B2 * | 9/2008 | Soudier et al. | 361/23 |
| 8,013,554 | B2 * | 9/2011 | West et al. | 318/432 |
| 2004/0030482 | A1 * | 2/2004 | Fuehrer et al. | 701/76 |
| 2004/0034810 | A1 * | 2/2004 | Heckmann et al. | 714/11 |
| 2004/0236537 | A1 * | 11/2004 | Eich et al. | 702/182 |
| 2005/0044214 | A1 * | 2/2005 | Schwertfuehrer | 709/224 |
| 2008/0208402 | A1 * | 8/2008 | Vhasure et al. | 701/22 |
| 2009/0118881 | A1 * | 5/2009 | West et al. | 701/22 |
| 2009/0125171 | A1 * | 5/2009 | West et al. | 701/22 |

(Continued)

*Primary Examiner* — Behrang Badii
*Assistant Examiner* — David Testardi
(74) *Attorney, Agent, or Firm* — Quinn Law Group, PLLC

(57) ABSTRACT

A controller for an electric vehicle having an electric motor is provided. The controller includes a motor control processor (MCP) module configured to control torque output of the electric motor. The controller also includes a first main processor monitor (MPM) module and a second MPM module. The first MPM module and the second MPM module are configured to separately determine a state of health of the MCP module, and to generate a first fault signal and a second fault signal, respectively, after determining the MCP module is not functional. The controller further includes a voting control module configured to receive at least one of the first fault signal from the first MPM module, and the second fault signal from the second MPM module, and to generate an override command when it receives both the first fault signal and the second fault signal. The override command overrides the MCP module.

14 Claims, 1 Drawing Sheet

(56) References Cited

U.S. PATENT DOCUMENTS

2012/0272104 A1* 10/2012 Jacobi et al. ............. 714/47.1
2012/0310467 A1* 12/2012 Faucett et al. ............. 701/29.8
2012/0316728 A1* 12/2012 Jacobi et al. ............. 701/34.4

* cited by examiner

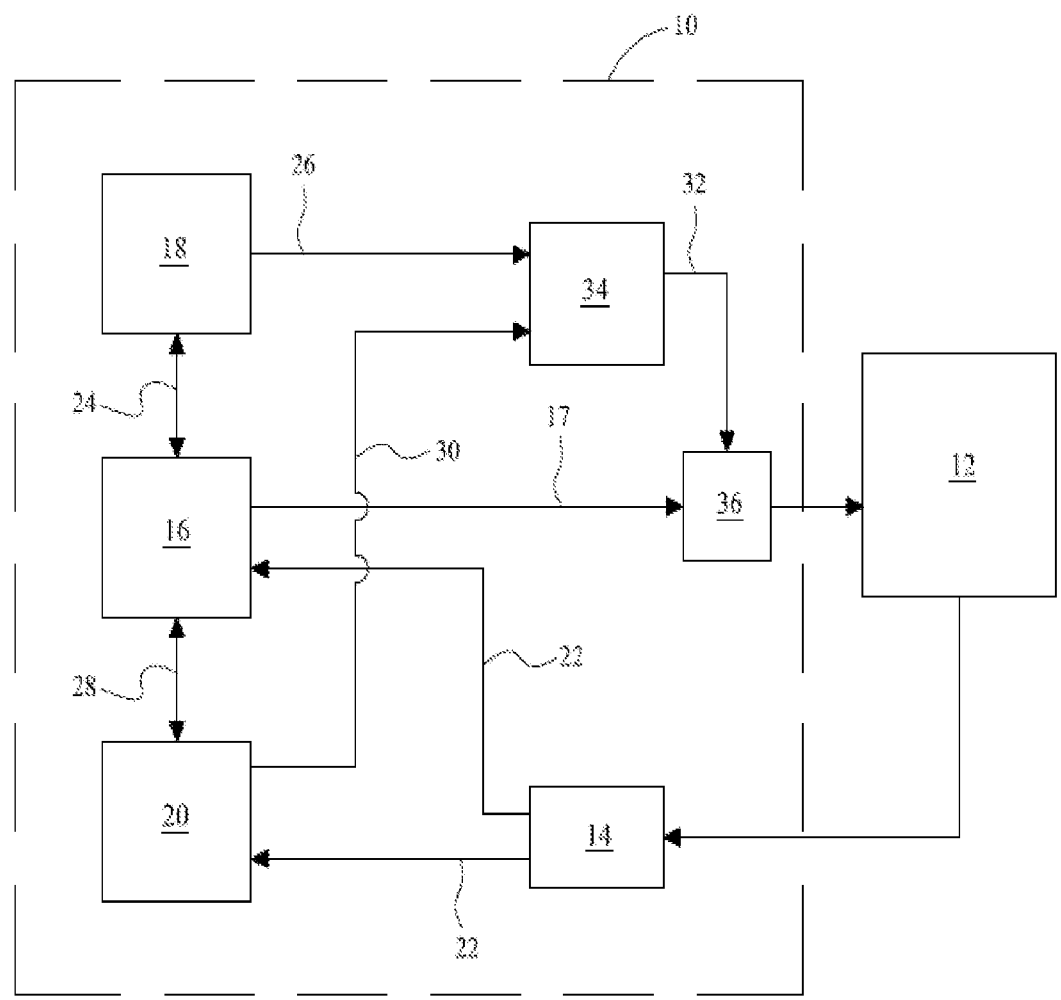

CONTROLLER FOR AN ELECTRIC MOTOR, AND A METHOD THEREOF

TECHNICAL FIELD

The present invention relates to a controller for an electric motor in an electric vehicle, and a method thereof.

BACKGROUND

An electric vehicle, such as a hybrid electric vehicle (HEV) and the like, generally utilizes one or more electric motors that may alone, or together with an internal combustion engine, propel the vehicle. The electric motors typically are three-phase alternating current (AC) motors, such as a permanent magnet motor. The AC motors are controlled by three-phase AC currents, which in turn are controlled by three-phase AC inverters within electric motor controllers. A processor or primary module is used to control the inverter, and therefore the torque output of the electric motor.

The electric vehicle may include secondary modules that monitor the state of health of the primary module. The state of health of the primary module may refer to whether the primary module is operating appropriately and/or has one or more faults. The secondary modules may perform diagnostic tests on the primary modules to determine the state of health of the primary modules. A module is determined to be healthy if it functions in a predetermined way for its intended purpose.

SUMMARY

A controller for an electric vehicle having an electric motor is provided. The controller includes a motor control processor (MCP) module, a first main processor monitor (MPM) module, a second MPM module, a voting control module, and an override control module. The MCP module is configured to generate at least one motor command to control torque output of the electric motor.

The first MPM module is configured to determine a state of health of the MCP module, and to generate a first fault signal if it determines that the MCP module is not functional. Similarly, the second MPM module is configured to separately determine the state of health of the MCP module, and to generate a second fault signal if it determines that the MCP module is not functional. At least one of the first MPM module and the second MPM module may determine the state of health via a seed-and-key exchange with the MCP module.

In the seed-and-key exchange, the at least one of the first MPM module and the second MPM module generates a seed value and an expected key, and transmits the seed value to the MCP module. The MCP module generates and transmits to the at least one of the first MPM module and the second MPM module a return key corresponding to the seed value. The at least one of the first MPM module and the second MPM module determines that the MCP module is not functional when the return key does not equal the expected key.

The voting control module is configured to receive at least one of the first fault signal from the first MPM module and the second fault signal from the second MPM module. The voting control module is also configured to generate an override command if it receives both the first fault signal and the second fault signal. The override command overrides the MCP module. The override control module is configured to receive the override command from the voting control module, and to execute the override command.

A method for controlling torque output of an electric motor via the controller described above is also provided. The method first includes determining a state of health of the MCP module by the first MPM module. If the first MPM module determines that the MCP module is not functional, then the method includes generating a first fault signal to be transmitted to the voting control module.

The method also includes determining the state of health of the MCP module by the second MPM module. If the second MPM module determines that the MCP module is not functional, then the method includes generating a second fault signal to be transmitted to the voting control module.

If the voting control module does not receive both the first fault signal and the second fault signal, then the method includes executing the motor command generated by the MCP module. However, if the voting control module does receive both the first fault signal and the second fault signal, then the method further includes generating, by the voting control module, an override command and transmitting it to the override control module. The method then includes executing, by the override control module, the override command.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The FIGURE is a schematic, system diagram of a controller for an electric motor of an electric vehicle;

DETAILED DESCRIPTION

Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

As used herein, the term module may refer to, be part of, or include an Application Specific Integrated Circuit (ASIC), an electronic circuit, a combinational logic circuit, a field programmable gate array (FPGA), a processor (shared, dedicated, or group) that executes code; other suitable components that provide the described functionality, or a combination of some or all of the above, such as in a system-on-chip. The term module may include memory (shared, dedicated, or group) that stores code executed by the processor.

Referring to the drawings, wherein like reference numbers correspond to like or similar components wherever possible throughout the several figures, a block diagram of a controller 10 for controlling an electric motor 12 of an electric vehicle is shown. The electric motor 12 may be, but is not limited to, a three-phase alternating current (AC) motor, such as a permanent magnet motor. In addition, the electric motor 12 may be a motor generator unit (MGU) that may operate as a generator, in addition to operating as a motor, to convert mechanical energy, e.g., torque, into electricity. While one electric motor 12 is shown, it should be appreciated that the controller 10 may control more than one electric motor 12 in the vehicle.

The controller 10 includes a motor diagnostic module 14, a motor control processor (MCP) module 16, a first main processor monitor (MPM) module 18, and a second MPM module 20. The motor diagnostic module 14 receives various inputs, including, but not limited to, motor speed, motor torque, and motor current of the electric motor 12. These inputs may be measured by respective sensors (not shown) that transmit the inputs to the motor diagnostic module 14. The motor diagnostic module 14, in turn, generates various signals 22 based on the inputs it receives, and transmits these signals 22 to the MCP module 16 and the second MPM 20 module, as described in more detail hereinafter. While only the second MPM module 20 is shown as receiving the signals 22 from the motor diagnostic module 14, it should be appreciated that the first MPM module 18 may also receive the signals 22 in lieu of or in addition to the second MPM module 20.

The MCP module 16 generally is the primary module configured to control the electric motor 12, specifically inverters (not shown) within the vehicle to control the torque output of the electric motor 12. To accomplish this, the MCP module is configured to generate a motor command(s) 17, based on the signals 22 received from the motor diagnostic module 14, and to transmit the motor command 17 to the electric motor 12 to be executed. It should be appreciated that the MCP module 16 also may be configured to receive motor torque requests, motor speed requests, and the like from other external modules (not shown) from other components and systems within the vehicle. It is desirable to ensure that the MCP module 16 is functioning properly such that it accurately commands the appropriate torque to be output by the electric motor 12.

The first MPM module 18 and the second MPM module 20 are secondary modules configured to separately monitor the state of health of the MCP module 16, i.e., whether or not it is functioning properly. The first MPM module 18 and the second MPM module 20 ensure that the other MPM modules 20 and 18 are functioning properly and do not misdiagnose the MCP module 16 as having failed, and therefore, override the motor command(s) 17 of the MCP module 16, when the MCP module 16 is still functional, as described in more detail below. To accomplish this, the first MPM module 18 and the second MPM module 20 may each perform a seed-and-key exchange, or a question-and-answer exchange, with the MCP module 16 over communications channels 24 and 28, respectively. The respective seed-and-key exchanges occur independently of each other.

In such an exchange between the first MPM module 18 and the MCP module 16, the first MPM module 18 generates a seed value and determines an expected key based on the seed value. The first MPM module 18 transmits the seed value to the MCP module 16, which, in turn, generates a return key corresponding to the seed value. The return key may be generated based on a logical computation and/or a lookup table in which a number of seeds and corresponding return keys are stored. The MCP module 16 subsequently transmits the generated return key to the first MPM module 18. When the return key returned by the MCP module 16 is the same as the expected key, the first MPM module 18 determines that the MCP module 16 is functional. However, when the return key is different than the expected key, the first MPM module 18 determines that the MCP module 16 is not functional, and subsequently generates a first fault signal 26 that it transmits to a voting control module 34, described in more detail hereinafter. The first fault signal 26 may be a pass/fail signal that notifies the voting control module 34 that the first MPM module 18 has determined the MCP module 16 to be functional or that it has failed.

In addition, when the first MPM module 18 does not observe any data activity from the MCP module 16 after transmitting the seed value to it, e.g., does not receive a return key within a specific time frame, the first MPM module 18 determines that there is a fault in the communications channel 24. In such a scenario, the first MPM module 18 also generates and sends to the voting control module 34 the first fault signal 26.

Similarly, in the seed-and-key exchange between the second MPM module 20 and the MCP module 16, the second MPM module 20 generates a seed value, for which it determines an expected key, and transmits the seed value to the MCP module 16. The MCP module 16 generates a corresponding return key and transmits it to the second MPM module 20. When the return key is the same as the expected key, the second MPM module 20 determines that the MCP module 16 is functional. When the return key is different than the expected key, the second MPM module 20 determines that the MCP module 16 is not functional, and subsequently generates a second fault signal 30 that it transmits to the voting control module 34. The second fault signal 30 may be a pass/fail signal that notifies the voting control module 34 that the second MPM module 20 has determined the MCP module 16 to be functional or that it has failed.

In another embodiment in which the second MPM module 20 is configured to receive any of the inputs 22, specifically motor speed, from the motor diagnostic module 14, the second fault signal 30 may be an enhanced signal representing a shutdown method for shutting down the electric motor 12. The shutdown method may be, but is not limited to, a three-phase short shutdown command or a three-phase open shutdown command, and is determined based upon the input(s) 22, i.e., the motor speed. In a three-phase short shutdown, electrical energy converted from mechanical energy by the electric motor 12 is cycled through the electric motor 12. In a three-phase open shutdown at high motor speeds, the electrical energy is stored in a battery (not shown) within the vehicle. The override command 32 is the three-phase open shutdown command when the vehicle is operating below a threshold motor speed, and the three-phase short shutdown command when the vehicle is operating above the threshold motor speed. This ensures that the vehicle coasts after the electric motor 12 has been shut down, i.e., maintains a steady deceleration.

As with the first MPM module 18, when the second MPM module 20 does not observe any data activity from the MCP module 16 after transmitting the seed value to it, e.g., does not receive a return key within a specific time frame, the second MPM module 20 determines that there is a fault in the communications channel 28. In such a scenario, the second MPM module 20 also generates and sends to the voting control module 34 the second fault signal 30.

The controller 10 also includes the voting control module 34 mentioned above and an override control module 36. The voting control module 34 is configured to receive the first fault signal 26 from the first MPM module 18 and the second fault signal 30 from the second MPM module 20. When the voting control module 34 receives both the first fault signal 26 and the second fault signal 30, it concludes that the MCP module 16 has failed, as agreed upon by the first MPM module 18 and the second MPM module 20. The voting control module 34 subsequently generates an override command 32, which may be determined by the second fault signal 30, and transmits it to the override control module 36. The override command 32 is meant to override the control of the MCP module 16 and the motor command(s) 17, for example, by shutting down the electric motor 12, and may be, but is not limited to, a three-phase open shutdown command or a three-phase short shutdown command, as determined by the second fault signal 30. However, when the voting control module 34 only receives the first fault signal 26 without the second fault signal 30, the voting control module 34 takes no action. Similarly, when the voting control module 34 receives the second fault signal 30 without the first fault signal 26, the voting control module 34 takes no action.

The override control module 36 is configured to execute the override command 32, e.g., shutdown the electric motor 12 via a three-phase open shutdown or a three-phase short shutdown as determined by the second MPM module 20, as explained above. When the MCP module 16 is functional and generates a motor command 17 to be sent to the electric motor 12, the override control module 36 performs no action, and allows the motor command 17 to pass through it to the electric motor 12.

A method for controlling the torque output of the electric motor 12 via the controller 10 is disclosed. When the method begins, the electric motor 12 and the MCP module 16 are operational, and the MCP module 16 is generating the motor command 17 to control the electric motor 12.

Afterwards, the first MPM module 18 determines the state of health of the MCP module 16. If the first MPM module 18 determines that the MCP module 16 is functional then method ends. If the first MPM module 18 determines that the MCP module 16 is not functional, then the first MPM module 18 may determine the state of health of the MCP module 16 by a seed-and-key exchange with the MCP module 16, and as such, may include several sub-steps.

To determine the state of health of the MCP module 16, the first MPM module 18 transmits a seed value to the MCP module 16. Then, the MCP module 16 generates a return key corresponding to the seed value. Also as mentioned above, the corresponding return key may be determined based on a lookup table and/or a logical computation. Next, the first MPM module 18 receives the return key from the MCP module 16. Then, the first MPM module 18 compares the return key with an expected key corresponding to the seed value. As explained above, if the return key matches the expected key, then the first MPM module 18 determines that the MCP module 16 is functional. If the return key does not match the expected key, then the first MPM module 18 determines that the MCP module 16 is not functional.

Next, the first MPM module 18 generates a first fault signal 26 and transmits it to the voting control module 34.

Also after the electric motor 12 and the MCP module 16 are operational, and the MCP module 16 is generating the motor command 17 to control the electric motor 12, the second MPM module 20 determines the state of health of the MCP module 16 independently of the first MPM module 18. Accordingly, the second MPM module 20 may determine the state of the health of the MCP module 16 simultaneously with, before, or after the first MPM module 18 determines the state of health of the MCP module 16. If the second MPM module 20 determines that the MCP module 16 is functional, then method ends. As with the first MPM module 18, the second MPM module 20 may determine the state of the health of the MCP module 16 via a seed-and-key exchange with the MCP module 16, and such determination may involve similar sub-steps as described above.

If the second MPM module 20 determines that the MCP module 16 is not functional, the second MPM module 20 generates a second fault signal 30 and transmits it to the voting control module 34. As explained above, the second fault signal 30 may be, but is not limited to, a three-phase open shutdown command or a three-phase short shutdown command, and may be dependent upon the motor speed of the electric motor 12.

After the first MPM module 18 generates a first fault signal 26 and transmits it to the voting control module 34 and the second MPM module 20 generates a second fault signal 30 and transmits it to the voting control module 34, the voting control module 34 generates an override command 32, as determined by the second fault signal 30 as explained above, and transmits it to the override control module 36. Next, the override control module 36 executes the override command 32. Then, the method ends.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A controller for an electric vehicle having an electric motor, the controller comprising:
   a motor control processor (MCP) module configured to generate at least one motor command to control torque output of the electric motor;
   a first main processor monitor (MPM) module configured to determine a state of health of the MCP module, and to generate a first fault signal if the first MPM module determines that the MCP module is not functional;
   a second MPM module configured to determine the state of health of the MCP module, and to generate a second fault signal if the second MPM module determines that the MCP module is not functional;
   a voting control module configured to receive at least one of the first fault signal from the first MPM module and the second fault signal from the second MPM module, and to generate an override command if the voting control module receives both the first fault signal and the second fault signal, wherein the second fault signal is a shutdown command for shutting down the electric motor, and the shutdown command is based upon a motor speed of the electric motor; and
   an override control module configured to receive the override command from the voting control module, and to execute the override command;
   wherein the override command overrides the MCP module.

2. The controller of claim 1 wherein at least one of the first MPM module and the second MPM module is configured to determine the state of health of the MCP module via a seed-and-key exchange in which the at least one of the first MPM module and the second MPM module generates a seed value and an expected key, and transmits the seed value to the MCP module, and the MCP module generates and returns to the at least one of the first MPM module and the second MPM module a return key corresponding to the seed value, the at least one of the first MPM module and the second MPM module determining that the MCP module is not functional when the return key does not equal the expected key.

3. The controller of claim 1 wherein at least one of the first fault signal and the second fault signal is a pass/fail signal.

4. The controller of claim 1 wherein the shutdown command is one of a three-phase open shutdown command and a three-phase short shutdown command, where the three-phase open shutdown command is appropriate when the electric motor is operating at a speed below a predetermined speed, and the three-phase short shutdown command is appropriate when the electric motor is operating at a speed above the predetermined speed.

5. The controller of claim 4 wherein the override command is equal to the second fault signal.

6. A method for controlling torque output of an electric motor via a controller having a motor control processor (MCP) module configured to generate a motor command, a first main processor monitor (MPM) module, a second MPM module, a voting control module, and an override control module, the method comprising:

determining, by the first MPM module, a state of health of the MCP module;

if the first MPM module determines that the MCP module is not functional, then generating a first fault signal to be transmitted to the voting control module;

determining, by the second MPM module, the state of health of the MCP module;

if the second MPM module determines that the MCP module is not functional, then generating a second fault signal to be transmitted to the voting control module, wherein the generating of the second fault signal includes determining an appropriate shutdown command to shut down the electric motor based upon a motor speed of the electric motor;

if the voting control module does not receive both the first fault signal from the first MPM module and the second fault signal from the second MPM module, then executing the motor command;

if the voting control module receives the first fault signal from the first MPM module, and the second fault signal from the second MPM module, then generating, by the voting control module, an override command to override the motor command;

transmitting the override command to the override control module; and executing, by the override control module, the override command.

7. The method of claim 6 wherein the determining, by the first MPM module, the state of health of the MCP module comprises:

transmitting a seed value to the MCP module, the seed value having a corresponding expected key;

receiving a return key generated by the MCP module; and comparing the return key and the expected key;

wherein the first MPM module determines that the MCP module is not functional when the return key and the expected key do not match.

8. The method of claim 6 wherein the determining, by the second MPM module, the state of health of the MCP module comprises:

transmitting a seed value to the MCP module, the seed value having a corresponding expected key;

receiving a return key generated by the MCP module; and comparing the return key and the expected key;

wherein the second MPM module determines that the MCP module is not functional when the return key and the expected key do not match.

9. The method of claim 6 wherein the second fault signal is one of a three-phase open shutdown command and a three-phase short shutdown command, where the three-phase open shutdown command is appropriate when the motor speed of the electric motor is below a predetermined speed, and the three-phase short shutdown command is appropriate when the motor speed is equal to or above the predetermined speed.

10. The method of claim 9 wherein the generating of the override command is based upon the second fault signal.

11. A controller for an electric vehicle having an electric motor, the controller comprising:

a motor control processor (MCP) module configured to control torque output of the electric motor;

a first main processor monitor (MPM) module and a second MPM module each configured to determine a state of health of the MCP module, the first MPM module further being configured to generate a first fault signal, and the second MPM module further being configured to generate a second fault signal, if they each determine that the MCP module is not functional, wherein the second fault signal is a shutdown command for shutting down the electric motor, and the shutdown command is based upon a motor speed of the electric motor;

a voting control module configured to receive the first fault signal from the first MPM module, and the second fault signal from the second MPM module, and to generate an override command; and an override control module configured to receive the override command from the voting control module, and to execute the override command;

wherein at least one of the first MPM module and the second MPM module are configured to communicate with the MCP module via a seed-and-key exchange to determine the state of health; and wherein the override command overrides the MCP module.

12. The controller of claim 11 wherein at least one of the first fault signal and the second fault signal is a pass/fail signal.

13. The controller of claim 11 wherein the shutdown command is one of a three-phase open shutdown command and a three-phase short shutdown command, where the three-phase open shutdown command is appropriate when the electric motor is operating at a speed below a predetermined speed, and the three-phase short shutdown command is appropriate when the electric motor is operating at a speed above the predetermined speed.

14. The controller of claim 13 wherein the override command is equal to the second fault signal.

* * * * *